Dec. 27, 1932. L. F. GRANIER 1,892,270

VARIABLE SPEED GEARING

Filed Dec. 30, 1931

Inventor:
Léon Frédéric Granier
by S. Sokal,
Attorney.

Patented Dec. 27, 1932

1,892,270

UNITED STATES PATENT OFFICE

LEON FREDERIC GRANIER, OF AIX, FRANCE

VARIABLE SPEED GEARING

Application filed December 30, 1931, Serial No. 583,896, and in France January 3, 1931.

The present invention relates to variable speed gearing, particularly to such gearing in which sun and planet wheels are employed.

The employment of sun and planet wheel gears with a system of gears constituting a differential for the purpose of obtaining, by exerting a braking action on one of the gears, variations of speed between a driving member and a driven member is known. Although, however, the speed variations thus obtained are perfect, the position is not the same with regard to the power transmitted, which, in the known apparatus, as a result of the powerful braking action which it is necessary to apply to one of the gears, is not inversely in proportion to the speed as is the case in the variable speed devices provided with sliding double-change speed wheels or pinions, such as are at present universally employed. This fact constitutes a drawback to the employment of progressive speed variation although the latter is otherwise so practical and convenient.

It is one object of the present invention to remove the aforesaid drawback to the progressive variation of speed by differential transmission by the provision of a variable speed gearing having two sun and planet wheel gears. According to the invention all the advantages of speed variation by means of differentials are obtained, whilst the braking action necessary for obtaining all the speeds between the direct drive and the zero point does not absorb more than a negligible part of the power by rendering it possible to recover the power employed for the braking action in proportion to the various speeds.

In order to render the principle of the invention clearer, it is pointed out that if the operation of a toothed wheel which is in engagement with an endless worm is considered, it will be noted that without altering the diameter of the toothed wheel or that of the worm it is possible, by merely varying the number of threads of the worm, to obtain varying speeds on the shaft of the wheel and likewise to effect the transmission of varying powers to the shaft of the wheel without altering the diameters of the said two members. From these facts the conclusion may be drawn that if, considering an ideal case, it were possible to vary at will the number of threads of the worm, progressive variation of speed could be obtained whilst the power transmitted would be inversely proportional to the speed in question. The aforesaid conditions are realized by means of the change speed gearing operating by means of sun and planet wheels according to the present invention.

A preferred constructional form of a variable speed gearing according to the invention is illustrated by way of example in the accompanying drawing, in which.

Figure 1:
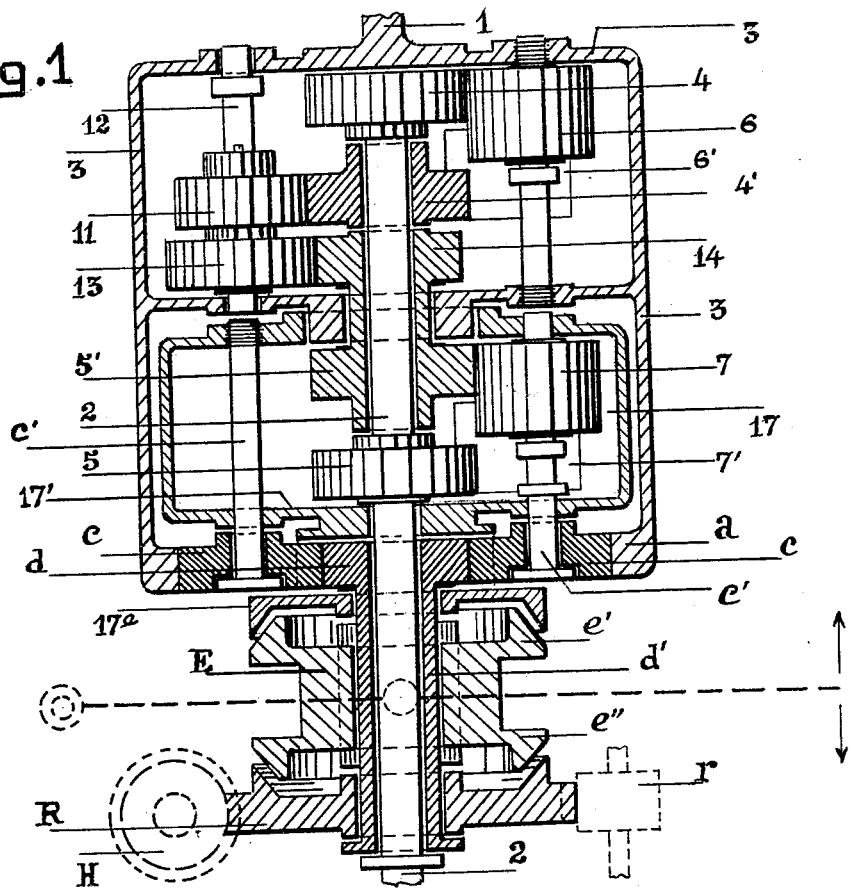
Fig. 1 is a longitudinal section of the variable speed gearing.
Figure 2:
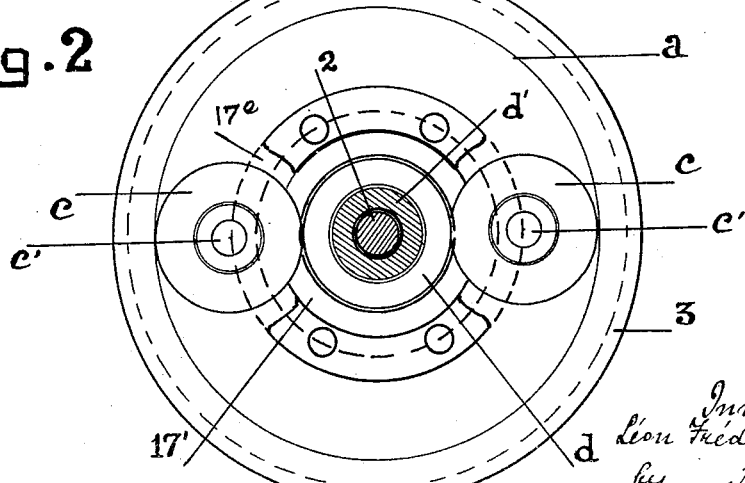
Fig. 2 is a front elevation thereof.

Referring to the drawing, the variable speed gearing consists essentially of two sun and planet wheel gears provided with conical or straight pinions arranged symmetrically in the interior of a housing 3, rigidly fixed to or integral with the driving shaft 1 and surrounding the driven shaft 2. The first sun and planet wheel gear associated with the housing 3 comprises pinions 6, 4 and 4'. The second sun and planet gear 17 comprises pinions 7, 5, and 5' and 14. The pinions 4 and 5 which are of the same diameter, are rigidly mounted on the driven shaft 2 and drive the latter, whilst the pinions 6 and 7 are rigidly mounted respectively on the housings 3 and 17 containing the two sun and planet wheel gears. The pinions 4' and 14, 5' turn freely on the shaft 2 and are connected by pinions 11 and 13, the action of which is to render the speeds of the two gears very slightly different from one another. The sun and planet gear 17 may be more or less rigidly connected to the gear of the housing 3 which always turns at the same speed as the engine. The rigid connection is obtained by means of one or more toothed wheels $c$ mounted loosely on the shafts $c'$, which participate in the movement of the housing 17. The said toothed wheels $c$ engage on the one hand with an internally toothed crown $a$ fixed on the housing 3 connected to the engine shaft, and on the other hand with a pinion $d$ keyed on a hollow shaft $d'$ which surrounds the driven shaft 2. On the shaft $d'$ a clutch sleeve E slides, by the aid of which the pinion $d$ may be rigidly connected either with the housing 17 or with a pinion R which is loosely mounted at the end of the shaft $d'$ and which is in engagement with a pinion $r$ or an endless worm H controlled by the starter. For this purpose the sleeve E is provided with a double clutch device as shown, operating on the cone principle. By causing the part $e'$ of the clutch sleeve to enter the cup $17^e$ which constitutes an extension of the housing 17, the latter is rigidly connected mechanically with the pinion $d$. If the clutch sleeve is moved in the reverse direction the said two last-named members are declutched and the pinions $d$ and R are rigidly connected with one another mechanically by means of the member $e''$.

The variable speed gearing, as described, operates in the following manner:

The two housings 3 and 17 run at speeds very closely approximating to one another, the transmission pinions 11, 13 and 14 effecting either an increase of speed or producing the contrary effect on the pinion $5'$ of the second sun and planet wheel gear. The speeds of the two housings are, however, always different until the toothed wheels $c$ cease to turn. Now it will readily be understood that the toothed wheels $c$ cease to turn when the housing 17 and the pinion $d$ are rigidly connected with one another mechanically. When this occurs, all the gears arranged in the interior of the housing 3 together with those arranged in the interior of the housing 17 turn at the speed of rotation of the driving shaft 1, the drive of the driven shaft 2 being effected by the planet wheels 6 and 7 which, in this case, operate as simple driving members, whereby the direct drive from the engine is effected. If, however, on the contrary, the toothed wheels $c$ are left entirely free to rotate, a differential action takes place in the sun and planet wheel gears 3 and 17, which tends to stop the pinions 4 and 5 rigidly connected to the driven shaft 2. In this position of the gears no power is transmitted. In order to obtain all the speed variations between the position in which no power is transmitted and the direct drive, it is necessary to provide for a variable braking action on the toothed wheels $c$. The said braking action reacts in a useful manner on the housing 3 and the pinion 5 fixed to the driven shaft 2. From this it results that the said pinion utilizes all the power which is derived from the second sun and planet wheel gear by means of the independent pinion $4'$ appertaining to the first sun and planet wheel gear through the medium of the pinions 11 and 13, the function of which is to take up the work resulting from the braking action and to recover it by means of the pinions 4 and 5. In fact, inasmuch as the shaft of the pinion 6 of the first sun and planet wheel gear is always carried round at the peripheral speed of the housing of the said gear, it follows that, according to the degree of braking action exerted upon the toothed wheels $c$, the pinions $4'$ and 14, which are associated with the pinions 11 and 13, and the shaft of which rotates likewise tangentially at the peripheral velocity of the housing 3, are subjected to variations of speed transmitted by the pinions 6 and 7 to the pinions 4 and 5 fixed to the driven shaft 2, but the resistance taken up in the braking action applied to the toothed wheels $c$ reacts, on the one hand on the housing 3, and on the other hand on the pinions 4 and 5, by means of the independent pinion $4'$ of the first sun and planet wheel gear, whereby almost all the power employed for the braking action is recovered and transmitted to the driven shaft 2. The pinions $4'$, 11, 13, 14 and $5'$ provided in the two sun and planet wheel gears fulfil the functions of an endless worm having variable threads, such as was mentioned at the outset.

The braking device for effecting the variations of speed operates as follows:

The pinion R which can be clutched by a suitable movement of the clutch E to the pinion $d$ is controlled by the endless worm H which is itself operated by the electro-motor of the starter. The speed of rotation of the said pinion which controls the amount of the braking action of the toothed wheel $c$ and consequently of the housing 17 is controlled by simply regulating the supply of current to the electro-motor in known manner.

Reversal is effected by increasing the speed of rotation of the pinion R beyond the limit which corresponds to the point at which no power is transmitted, which latter point is obtained by simple declutching of the pinion R from the housing 17.

The starting up of the engine can be effected in known manner by causing the electro-motor to act on the pinion R rigidly fixed on the shaft $d'$.

It will readily be understood that, as a result of the reversability of the motion, the variable speed gearing is adapted for the braking of the mechanism by the engine at all speeds. It is sufficient, when the fuel has been cut off, to impart to the pinion R fixed to the shaft $d'$, the speed which corresponds to the desired speed of running.

It should be particularly noted that an important feature of the invention consists in the employment of two sun and planet wheel gears which operate in such manner as to avoid the loss of power resulting from the braking action necessary in order to obtain the variations of speed of the driven shaft and the variations of power, as a result of the very slight difference between the speeds of rotation of the said two sun and planet wheel gears.

It is to be understood that the variable speed gearing according to the invention can be varied in respect to its constructional form and dimensions without departing from the scope of the invention.

I claim:

1. In a variable speed gearing operating by means of planet wheels, the combination of: a driving shaft; a sun and planet wheel gear driven by said driving shaft; a second sun and planet wheel gear arranged with its axis in alinement with the axis of said first named sun and planet wheel gear; independent gear wheels arranged to turn around the axis of said sun and planet wheel gears; independent gear wheels arranged to turn about an axis parallel to that of said sun and planet wheel gears and co-operating with said first named independent gear wheels to transmit power from one of said sun and planet wheel gears to the other in such manner that the said sun and planet wheel gears run at speeds differing very little from one another; and a device comprising gear wheels for braking said independent gear wheels to effect the speed variations, substantially as described.

2. In a variable speed gearing operating by means of planet wheels, the combination of: a driving shaft; a housing carried by said driving shaft; a sun and planet wheel gear arranged within and driven by said housing; a driven shaft; a second sun and planet wheel gear operatively connected to said driven shaft and arranged with its axis in alinement with the axis of said first named sun and planet wheel gear; independent gear wheels arranged to turn around the axis of said sun and planet wheel gears; independent gear wheels arranged to turn about an axis parallel to that of said sun and planet wheel gears and co-operating with said first named independent gear wheels to transmit power from one of said sun and planet wheel gears to the other in such manner that the said sun and planet wheel gears run at speeds differing very little from one another; and a device comprising gear wheels for braking said independent gear wheels to vary the speed transmitted to said driven shaft through said second sun and planet gear, substantially as described.

3. In a variable speed gearing operating by means of planet wheels, the combination of: a driving shaft; a housing carried and driven by said driving shaft; a sun and planet wheel gear arranged within and driven by said housing; a driven shaft; a second housing mounted on said driven shaft; a second sun and planet wheel gear operatively connected to said driven shaft and arranged with its axis in alinement with the axis of said first named sun and planet wheel gear; independent gear wheels adapted to turn around the axis of said sun and planet wheel gears; an axle mounted in said first named housing parallel to the axis of said sun and planet wheel gears; independent gear wheels turning round said axle and co-operating with said first named independent gear wheels to transmit power from one of said planet wheel gears to the other in such manner that the said sun and planet wheel gears run at speeds differing very little from one another; and gear wheels arranged in said housing for braking said independent gear wheels to vary the speed transmitted to said shaft through said second sun and planet gear, substantially as described.

4. In a variable speed gearing operating by means of planet wheels, the combination of: a driving shaft; a housing carried by said driving shaft; a sun and planet wheel gear arranged within and driven by said housing; a driven shaft; a second sun and planet wheel gear operatively connected to said driven shaft and arranged with its axis in alinement with the axis of said first named sun and planet wheel gear; independent gear wheels arranged to turn around the axis of said sun and planet wheel gears; independent gear wheels arranged to turn about an axis parallel to that of said sun and planet wheel gears and co-operating with said first named independent gear wheels to transmit power from one of said sun and planet wheel gears to the other in such manner that the said sun and planet wheel gears run at speeds differing very little from one another; a device comprising gear wheels for braking said independent gear wheels to vary the speed transmitted to said driven shaft through said second sun and planet gear; and a clutch member for controlling said braking device, substantially as described.

5. In a variable speed gearing operating by means of planet wheels, the combination of: a driving shaft; a housing carried by said driving shaft; a sun and planet wheel gear arranged within and driven by said housing; a driven shaft; a second sun and planet wheel gear operatively connected to said driven shaft and arranged with its axis in alinement with the axis of said first named sun and planet wheel gear; independent gear wheels arranged to turn around the axis of said sun and planet wheel gears; independent gear wheels arranged to turn about an axis parallel to that of said sun and planet wheel gears and co-operating with said first named independent gear wheels to transmit power from one of said sun and planet wheel gears to the other in such manner that the said sun and planet wheel gears run at speeds differing very little from one another; a device comprising gear wheels for braking said independent gear wheels to vary the speed transmitted to said driven shaft through said second sun and planet gear; and motor driven means for driving said last-named device, substantially as described.

Signed at Marseille, France, this 16 day of December, 1931.

LEON FREDERIC GRANIER.